United States Patent
Dawkins et al.

(10) Patent No.: US 6,839,892 B2
(45) Date of Patent: Jan. 4, 2005

(54) OPERATING SYSTEM DEBUGGER EXTENSIONS FOR HYPERVISOR DEBUGGING

(75) Inventors: George John Dawkins, Austin, TX (US); Bruce G. Mealey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 09/903,936

(22) Filed: Jul. 12, 2001

(65) Prior Publication Data

US 2003/0014738 A1 Jan. 16, 2003

(51) Int. Cl.$^7$ ............................................... G06F 9/44
(52) U.S. Cl. ..................... 717/124; 717/126; 711/140; 711/153; 714/4; 714/25
(58) Field of Search ............................. 717/124, 126; 714/4, 25, 233; 711/153, 140, 170, 160; 713/1, 2, 200; 718/100, 105

(56) References Cited

U.S. PATENT DOCUMENTS

| | | | | |
|---|---|---|---|---|
| 4,435,752 A | * | 3/1984 | Winkelman | 707/205 |
| 5,701,477 A | * | 12/1997 | Chejlava, Jr. | 713/2 |
| 5,764,215 A | * | 6/1998 | Brown et al. | 345/620 |
| 5,828,824 A | * | 10/1998 | Swoboda | 714/25 |
| 5,887,146 A | * | 3/1999 | Baxter et al. | 710/104 |
| 5,889,988 A | * | 3/1999 | Held | 718/103 |
| 5,958,049 A | * | 9/1999 | Mealey et al. | 713/1 |
| 6,289,448 B1 | * | 9/2001 | Marsland | 713/2 |
| 6,324,683 B1 | * | 11/2001 | Fuh et al. | 717/124 |
| 6,381,682 B2 | * | 4/2002 | Noel et al. | 711/153 |
| 6,449,735 B1 | * | 9/2002 | Edwards et al. | 714/25 |
| 6,546,477 B1 | * | 4/2003 | Russo et al. | 711/170 |
| 6,629,187 B1 | * | 9/2003 | Krueger et al. | 711/3 |
| 6,658,571 B1 | * | 12/2003 | O'Brien et al. | 713/200 |
| 6,662,357 B1 | * | 12/2003 | Bowman-Amuah | 717/120 |
| 6,681,358 B1 | * | 1/2004 | Karimi et al. | 714/733 |
| 6,684,343 B1 | * | 1/2004 | Bouchier et al. | 714/4 |
| 6,691,146 B1 | * | 2/2004 | Armstrong et al. | 718/100 |
| 6,711,693 B1 | * | 3/2004 | Golden et al. | 713/400 |

OTHER PUBLICATIONS

TITLE: αWIT on-line debugger for application systems using a μITRON-specification operating system, author: Miyatomi et al, IEEE, Nov. 1991.*

TITLE: Toward user sharing of the microprogramming level under UNIX on the Perkin-Elmer 3220, author: Roskos et al, ACM, 1981.*

TITLE: Hardware Fault Containment in Scalable Shared-Memory Multiprocessors, author: Teodosiu et al, ACM, 1997.*

TITLE: Debugging Concurrency Extensions for Standard ML, author: Tolmach et al, ACM, 1991.*

* cited by examiner

*Primary Examiner*—Chameli Das
(74) *Attorney, Agent, or Firm*—Duke W. Yee; Volel Emile; Wayne P. Bailey (57) ABSTRACT

A data processing system, method, and product are disclosed for debugging partition management firmware from an existing operating system debugger. The partition management firmware is also called a hypervisor. The data processing system is logically partitioned and includes an operating system debugger and hypervisor software. An operating system and the operating system debugger are stored in one of the logical partitions. Extensions are included within the operating system debugger. The extensions are then utilized by the existing operating system debugger to debug the hypervisor.

24 Claims, 4 Drawing Sheets

OPERATING SYSTEM DEBUGGER EXTENSIONS FOR HYPERVISOR DEBUGGING

BACKGROUND OF THE INVENTION

1. Technical Field

The present invention relates generally to the field of computer systems and, more specifically to a data processing system, method, and product for including extensions in an existing operating system debugger that may be used to debug hypervisor software.

2. Description of Related Art

A logical partitioning option (LPAR) within a data processing system (platform) allows multiple copies of a single operating system (OS) or multiple heterogeneous operating systems to be simultaneously run on a single data processing system hardware platform. A partition, within which an operating system image runs, is assigned a non-overlapping subset of the platform's hardware resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

Many logically partitioned systems make use of a hypervisor. A hypervisor is a layer of privileged software between the hardware and logical partitions that manages and enforces partition protection boundaries. The hypervisor is also referred to as partition management firmware. The hypervisor is responsible for configuring, servicing, and running multiple logical systems on the same physical hardware. The hypervisor is typically responsible for allocating resources to a partition, installing an operating system in a partition, starting and stopping the operating system in a partition, dumping main storage of a partition, communicating between partitions, and providing other functions. In order to implement these functions, a hypervisor also has to implement its own low level operations like main storage management, synchronization primitives, I/O facilities, heap management, and other functions.

During development, software, such as a hypervisor, often includes one or more inadvertent errors. Locating and removing the errors in software is generally known in the industry as "debugging" the software, with errors being referred to as "bugs".

Known systems for debugging a hypervisor require the use of a dedicated hypervisor debugger which is written specifically for use by the hypervisor. Time, and therefore money, is required during development of systems in order to develop a dedicated hypervisor debugger.

Operating system debuggers are known in the art and are widely available. Operating system debuggers are utilized to debug an operating system. Known operating system debuggers may not be used to debug a hypervisor however, because operating systems are prohibited from directly accessing the hypervisor's resources.

Therefore, a need exists for a method, system, and product whereby an existing operating system debugger is modified by adding hypervisor extensions which enable the operating system debugger to directly access a hypervisor's resources in order to debug the hypervisor. In this manner, valuable development time and expense is saved by using a modified, existing operating system to debug hypervisor software.

SUMMARY OF THE INVENTION

A data processing system, method, and product are disclosed for debugging partition management firmware utilizing an existing operating system debugger. The partition management firmware is also called a hypervisor. The data processing system is logically partitioned and includes an operating system debugger and hypervisor software. An operating system and the operating system debugger are stored in one of the logical partitions.

In known systems, operating systems and operating system debuggers are not permitted to directly access resources controlled by the hypervisor, such as the physical memory. The present invention describes modifying an existing operating system debugger by adding extensions to the existing operating system debugger. The extensions may be utilized by the existing operating system debugger to directly access hypervisor resources and thus to debug the hypervisor.

These extensions include an event handler routine which is code which exists within the existing operating system debugger which is alerted by the hypervisor when hypervisor events occur. In response to these events, the existing operating system debugger may then invoke other extensions to cause the hypervisor to read data from physical memory locations specified by the operating system debugger, to cause the hypervisor to write specified data to physical memory locations specified by the operating system debugger, and to perform other hypervisor functions.

In this manner, an existing operating system debugger may be modified and used to debug hypervisor software without the need for writing a dedicated hypervisor debugger that exists within the hypervisor for debugging the hypervisor.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

Figure 1:
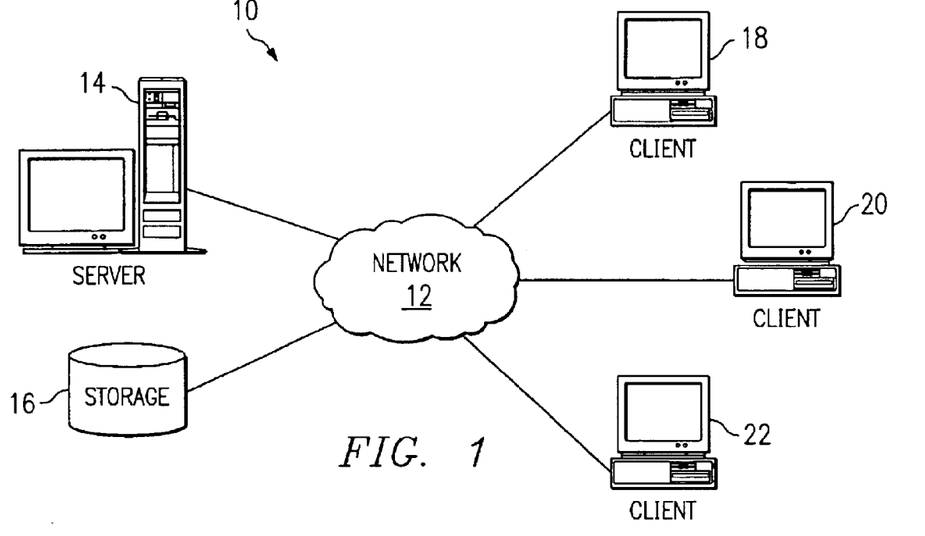
FIG. 1 is a pictorial representation which depicts a data processing system in which the present invention may be implemented in accordance with a preferred embodiment of the present invention.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18–22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
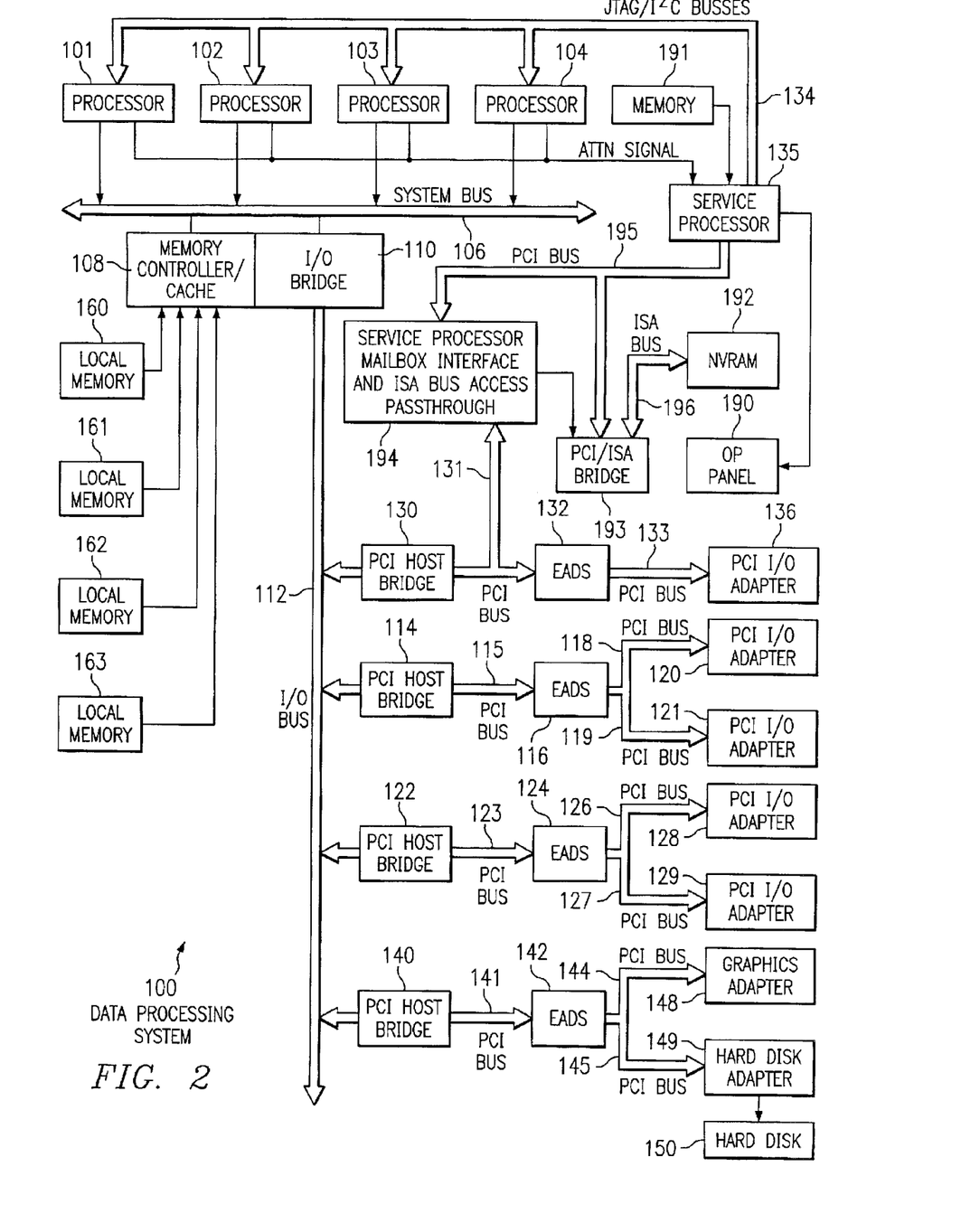
FIG. 2 is a more detailed block diagram of a data processing system in which the present invention may be implemented in accordance with the present invention.

FIG. 2 is a more detailed block diagram of a data processing system in which the present invention may be implemented. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–163 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI-PCI bridge) via PCI buses 144 and 145 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATS, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for reconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
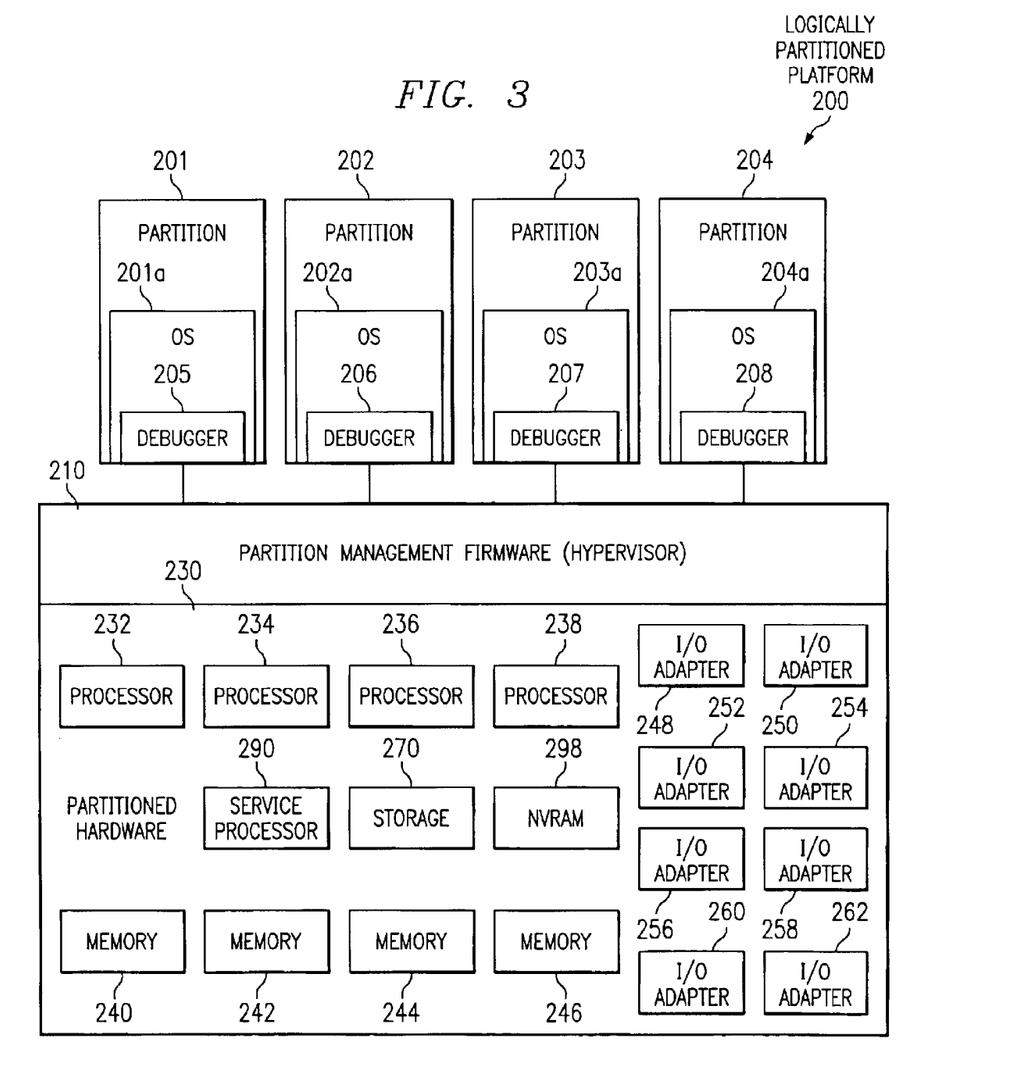
FIG. 3 is a block diagram of an exemplary logically partitioned platform in which the present invention may be implemented.

FIG. 3 is a block diagram of an exemplary logically partitioned platform is depicted in which the present invention may be implemented. Logically partitioned platform 200 includes partitioned hardware 230, partition management firmware, also called a hypervisor, 210, and partitions 201–204. Operating systems 201a–204a exist within partitions 201–204. Operating systems 201a–204a may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298, and I/O adapters 248–262 may be assigned to one of multiple partitions 201–204.

Partition management firmware (hypervisor) 210 performs a number of functions and services for partitions 201–204 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–204a by virtualizing all the hardware resources of logically partitioned platform 200. Hypervisor 210 may attach I/O devices through I/O adapters 248–262 to single virtual machines in an exclusive mode for use by one of OS images 201a–204a.

A debugger may be included in each operating system. These debuggers are existing pieces of software which may be utilized to debug the operating system in which the debugger resides. For example, operating system 201a includes debugger 205. Operating system 202a includes debugger 206. Operating system 203a includes debugger 207. And, operating system 204a includes debugger 208.

These debuggers were written to debug the operating system in which they are included. In prior art systems, these debuggers can access only the logical memory assigned to the partition within which the debugger resides. In the prior art, these debuggers could not directly access the physical memory, which is controlled by hypervisor 210.

According to the present invention, hypervisor extensions are added to an existing operating system debugger to enable the existing OS debugger to debug the hypervisor code. The extensions permit the existing operating system debuggers to directly access the physical memory space. The extensions are application programming interface (API) calls that can be invoked by the existing operating system debugger that then cause the hypervisor to perform specified low-level hypervisor operations such as reading from or writing to physical memory locations, reading from or writing to hypervisor registers, or any other hypervisor operation.

Figure 4:
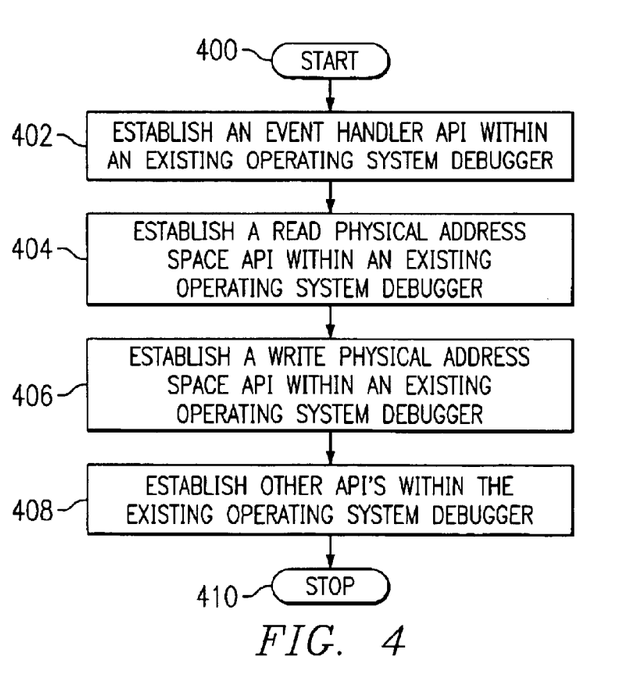
FIG. 4 illustrates a high level flow chart which depicts modifying an existing operating system debugger by adding extensions to the existing operating system debugger in accordance with the present invention.

FIG. 4 depicts a high level flow chart which illustrates establishing extensions within an existing operating system debugger for debugging a hypervisor in accordance with the present invention. The process starts as depicted by block 400 and thereafter passes to block 402 which illustrates establishing an event handler API within an existing operating system debugger. The event handler API is one of the operating system extensions. An event handler API is used by the existing operating system debugger to register an event handler with the partition management firmware (hypervisor). The event handler is code that resides within the OS debugger that is invoked asynchronously, much like an interrupt, by the hypervisor to notify the OS debugger of events that may be of interest to the OS debugger. Events of interest may include fatal hypervisor errors or debug trap instructions for example. The following is an example of an event handler API:

```
int
h_debug_handler(
   void (*handler)(int event),
)
```

The input parameter for this API is "handler". This is the name of the event handler within the existing operating system debugger. The return values for this API are either a "0" to indicate that the event handler was successfully registered, or an "ENODEV" parameter to indicate that hypervisor debugging is not enabled.

The process then passes to block 404 which depicts establishing a "Read Physical Address Space" API within the existing operating system debugger that will cause the hypervisor to read a physical address and return the value to the operating system debugger. The "Read Physical Address Space" API is another operating system extension. The following is an example of a "Read Physical Address Space" API:

```
int
h_debug-read-memory(
   void *hypervisor_memory_address,
   size_t size,
   void *data)
```

The parameters are "hypervisor_memory_address" which specifies the memory address the hypervisor is to read, "size" which specifies the number of bytes to read, and "data" which specifies the value read from the address. The return values for this API are a "0" to indicate that the API was executed successfully, an "ENODEV" parameter to indicate that hypervisor debugging is not enabled, or an "EINVAL" parameter to indicate a bad parameter.

Next, block 406 illustrates establishing a "Write Physical Address Space" API within the existing operating system debugger that will cause the hypervisor to write a particular value into a physical address. The "Write Physical Address Space" API is another operating system extension. The following is an example of a "Write Physical Address Space" API:

```
int
h_debug-write-memory(
   void *hypervisor_memory_address,
   size_t size,
   void *data)
```

The parameters are "hypervisor_memory_address" which specifies the memory address the hypervisor is to be written to, "size" which specifies the number of bytes to be written, and "data" which specifies the value to be written into the address. The return values for this API are a "0" to indicate that the API was executed successfully, an "ENODEV" parameter to indicate that hypervisor debugging is not enabled, or an "EINVAL" parameter to indicate a bad parameter.

Typically, an operating system and other software executing within a partition can gain access only to the logical memory assigned to that partition. The operating system and other software cannot normally directly access a physical address space. The two APIs described above permit an operating system debugger to read directly from or write directly to a specified physical address. These two APIs are used by an existing operating system debugger to gain direct read/write access to the entire system's physical address space.

Thereafter, block 408 depicts establishing other APIs within the existing operating system debugger as hypervisor extensions to the existing operating system debugger. For example, an API could be established that would cause the hypervisor to read one of its registers and return the value to the operating system debugger. As another example, an API could be established that would cause the hypervisor to write a value specified within the API to one of the hypervisor's registers. The process then terminates as depicted by block 410.

Figure 5:
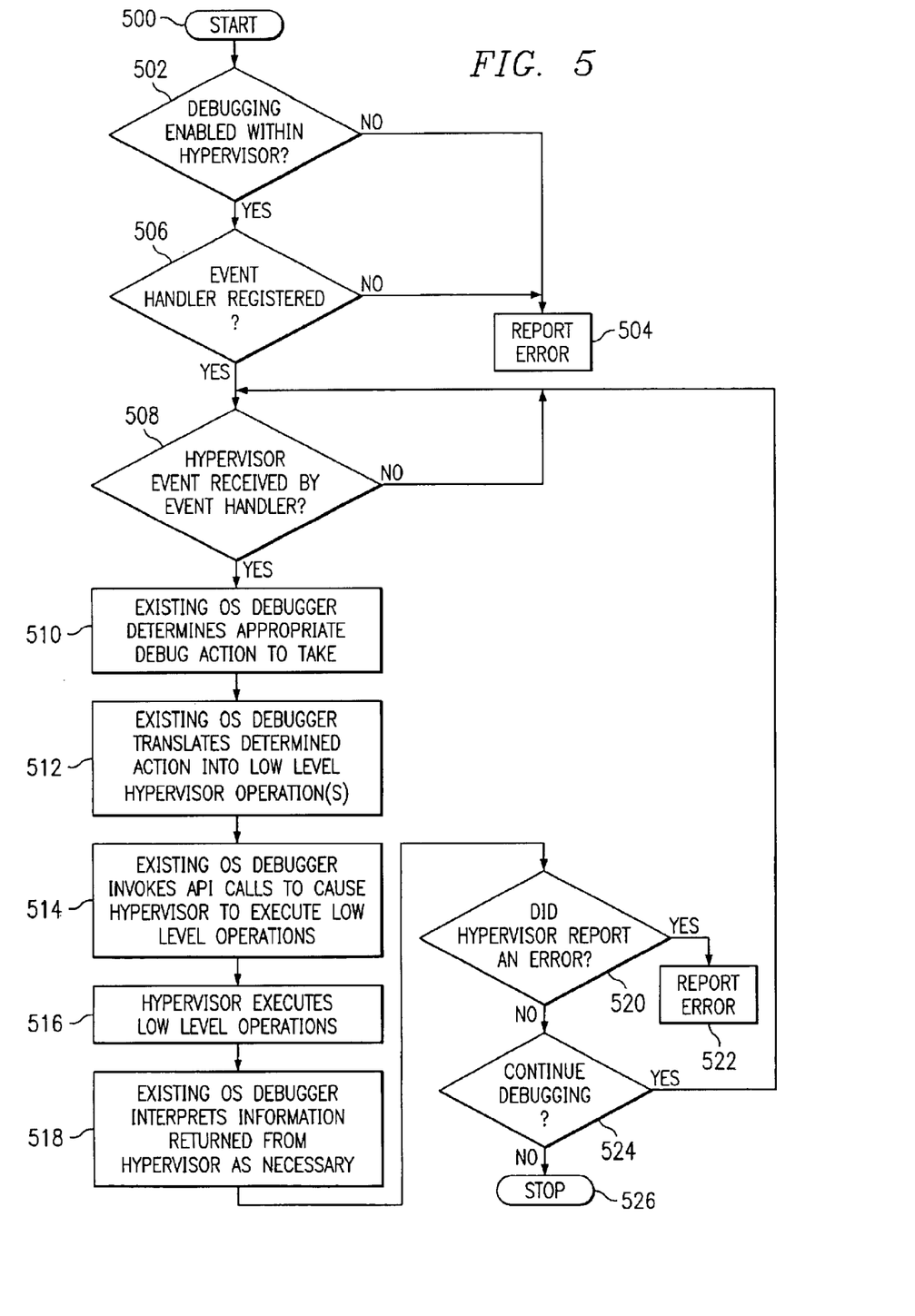
FIG. 5 depicts a high level flow chart which illustrates using the modified, existing operating system debugger to debug a hypervisor in accordance with the present invention.

FIG. 5 illustrates a high level flow chart which depicts using extensions included within an existing operating system debugger to debug a hypervisor in accordance with the present invention. The process starts as depicted by block 500 and thereafter passes to block 502 which illustrates a determination of whether or not debugging is enabled within the partition management firmware (hypervisor). Service processor 290 may be used to either enable or disable hypervisor debugging. When the service processor has disabled debugging within the hypervisor, the operating system debugger will not be able to execute its hypervisor extensions and will receive a return code indicating that hypervisor debugging is not enabled if the operating system calls one of the hypervisor extension APIs. When the service processor has enabled debugging, debugging using the extensions that have been added to the existing operating system debugger may proceed.

If a determination is made that debugging is not enabled within the hypervisor, the process passes to block 504. Referring again to block 502, if a determination is made that debugging is enabled, the process passes to block 506 which depicts a determination of whether or not an event handler has been registered within the hypervisor. An event handler is code that resides within the OS debugger that is invoked asynchronously by the hypervisor to notify the OS debugger of events that may be of interest to the OS debugger. An event handler must be registered within the hypervisor in order to permit debugging by the existing operating system debugger. If a determination is made that an event handler is not registered with the hypervisor, the process passes to block 504.

Referring again to block 506, if a determination is made that an event handler is registered with the hypervisor, the process passes to block 508 which illustrates a determination of whether or not an event has been received by the event handler. If a determination is made that an event has not been received by the event handler, the process passes back to block 508. Referring again to block 508, if a determination is made that an event been received by the event handler, the process passes to block 510 which depicts the existing operating system debugger determining an appropriate debug action to take in response to the received event.

The operating system debugger process of determining an appropriate debug action is known in the art and is not described herein. Any suitable method of making such a determination may be utilized. Further, a user may make this determination instead of the operating system debug software.

Once an appropriate debug action is determined, the action is translated, as depicted in block 512, into low level hypervisor operations, such as read memory, write memory, read registers, write registers, etc. Again, the process of translating the debug action into appropriate low level hypervisor actions is known in the art and is not described herein.

Describing again the present invention, the process then passes to block 514 which illustrates the existing operating system debugger invoking API calls to cause the hypervisor to execute these low level operations. Next, block 516 depicts the hypervisor executing the low level operations and returning return codes and/or data as required by the API calls invoked by the operating system debugger. Thereafter, block 518 illustrates the existing operating system debugger interrupting the information returned from the hypervisor as necessary. For example, the value stored in a particular physical address space is returned in response to invoking a "Read Physical Address Space" API. The existing operating system debugger should interrupt this information returned by the hypervisor. In response to invoking other API calls, a return value may be returned which should then be interrupted.

The process then passes to block 520 which depicts a determination of whether or not the hypervisor reported an error. For example, if debugging has been disabled by the service processor, a return code will be reported by the hypervisor indicating that the debugging option is not enabled. In response to a determination that the hypervisor reported an error, the process passes to block 522. Referring again to block 520, if a determination is made that the hypervisor did not report an error, the process passes to block 524 which illustrates a determination of whether or not to continue debugging. If a determination is made to continue debugging, the process passes back to block 508. Referring again to block 524, if a determination is made to discontinue debugging, the process terminates as depicted by block 526.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logically partitioned data processing system including a plurality of logical partitions, an operating system debugger and partition management firmware, said partition management firmware being operable to allocate resources to and manage the plurality of logical partitions, said method comprising the steps of:

establishing extensions within said operating system debugger, said extensions enabling direct access to said resources of said partition management firmware by said operating system debugger; and utilizing said extensions to debug said partition management firmware, wherein said operating system debugger without said extensions would not otherwise have direct access to said resources.

2. The method according to claim 1, further comprising the step of establishing function calls within said operating system debugger that when invoked by said operating system debugger cause said partition management firmware to execute partition management firmware operations.

3. The method according to claim 2, further comprising the steps of:

establishing an event handler routine within said operating system debugger;

invoking said event handler routine by said operating system debugger; and reporting, from said partition management firmware to said operating system debugger, partition management firmware events in response to said operating system debugger invoking said event handler routine.

4. The method according to claim 2, further comprising the steps of:

establishing a read memory call within said operating system debugger;

invoking said read memory function call by said operating system debugger; and directly reading data from a physical memory location utilizing said partition management firmware in response said operating system debugger invoking said read memory function call.

5. The method according to claim 2, further comprising the steps of:

establishing a write memory call within said operating system debugger;

invoking said write memory function call by said operating system debugger; and directly writing data to a physical memory location utilizing said partition management firmware in response said operating system debugger invoking said write memory function call.

6. The method according to claim 1, further comprising the steps of:

determining whether debugging is enabled within said partition management firmware;

permitting said operating system debugger to utilize said extensions to debug said partition management firmware in response to a determination that debugging is enabled within said partition management firmware; and prohibiting said operating system debugger to utilize said extensions to debug said partition management firmware in response to a determination that debugging is disabled within said partition management firmware.

7. The method according to claim 6, further comprising the steps of:

including a service processor within said data processing system;

enabling debugging within said partition management firmware utilizing said service processor; and disabling debugging within said partition management firmware utilizing said service processor.

8. The method according to claim 1, wherein said data processing system includes hardware comprising physical memory, wherein said operating system debugger exists within a partition, and further wherein said partition management firmware exists between said partition and said hardware, and wherein said operating system debugger is operable to directly access said physical memory using said extensions in conjunction with said partition management firmware.

9. A computer program product in a logically partitioned data processing system including a plurality of logical partitions, an operating system debugger and a partition management firmware, said partition management firmware being operable to allocate resources to and manage the plurality of logical partitions, comprising:

instruction means for establishing extensions within said operating system debugger, said extensions enabling direct access to said resources of said partition management firmware by said operating system debugger; and instruction means for utilizing said extensions to debug said partition management firmware, wherein said operating system debugger without said extensions would not otherwise have direct access to said resources.

10. The product according to claim 9, further comprising instruction means for establishing function calls within said operating system debugger that when invoked by said operating system debugger cause said partition management firmware to execute partition management firmware operations.

11. The product according to claim 10, further comprising:

instruction means for establishing an event handler routine within said operating system debugger;

instruction means for invoking said event handler routine by said operating system debugger; and instruction means for reporting, from said partition management firmware to said operating system debugger, partition management firmware events in response to said operating system debugger invoking said event handler routine.

12. The product according to claim 10, further comprising:

instruction means for establishing a read memory call within said operating system debugger;

instruction means for invoking said read memory function call by said operating system debugger; and instruction means for directly reading data from a physical memory location utilizing said partition management firmware in response said operating system debugger invoking said read memory function call.

13. The product according to claim 10, further comprising:

instruction means for establishing a write memory call within said operating system debugger;

instruction means for invoking said write memory function call by said operating system debugger; and instruction means for directly writing data to a physical memory location utilizing said partition management firmware in response said operating system debugger invoking said write memory function call.

14. The product according to claim 9, further comprising:

instruction means for determining whether debugging is enabled within said partition management firmware;

instruction means for permitting said operating system debugger to utilize said extensions to debug said partition management firmware in response to a determination that debugging is enabled within said partition management firmware; and instruction means for prohibiting said operating system debugger to utilize said extensions to debug said partition management firmware in response to a determination that debugging is disabled within said partition management firmware.

15. The product according to claim 14, further comprising:

instruction means for including a service processor within said data processing system;

instruction means for enabling debugging within said partition management firmware utilizing said service processor; and instruction means for disabling debugging within said partition management firmware utilizing said service processor.

16. The product according to claim 9, wherein said data processing system includes hardware comprising physical memory, wherein said operating system debugger exists within a partition, and further wherein said partition management firmware exists between said partition and said hardware, and wherein said operating system debugger is operable to directly access said physical memory using said extensions in conjunction with said partition management firmware.

17. A logically partitioned data processing system including a plurality of logical partitions, an operating system debugger and a partition management firmware, said partition management firmware being operable to allocate resource to and manage the plurality of logical partitions, comprising:

extensions included within said operating system debugger, said extensions enabling direct access to said resources of said partition management firmware by said operating system debugger; and said operating system debugger for utilizing said extensions to debug said partition management firmware, wherein said operating system debugger without said extensions would not otherwise have direct access to said resources.

18. The system according to claim 17, further comprising function calls established within said operating system debugger that when invoked by said operating system debugger cause said partition management firmware to execute partition management firmware operations.

19. The system according to claim 18, further comprising:

said operating system debugger including an event handler routine;

said operating system debugger for invoking said event handler routine; and said partition management firmware for reporting to said operating system debugger partition management firmware events in response to said operating system debugger invoking said event handler routine.

20. The system according to claim 18, further comprising:

said operating system debugger including a read memory call;

said operating system debugger for invoking said read memory function; and said partition management firmware for directly reading data from a physical memory location in response said operating system debugger invoking said read memory function call.

21. The system according to claim 18, further comprising:

said operating system debugger including a write memory call;

said operating system debugger for invoking said write memory function; and said partition management firmware for directly writing data to a physical memory location in response said operating system debugger invoking said write memory function call.

22. The system according to claim 17, further comprising:

means for determining whether debugging is enabled within said partition management firmware;

said operating system debugger being permitted to utilize said extensions to debug said partition management firmware in response to a determination that debugging is enabled within said partition management firmware; and said operating system debugger being prohibited from utilizing said extensions to debug said partition management firmware in response to a determination that debugging is disabled within said partition management firmware.

23. The system according to claim 22, further comprising:

a service processor included within said data processing system; and said service processor for enabling and disabling debugging within said partition management firmware.

24. The system according to claim 17, wherein said data processing system includes hardware comprising physical memory, wherein said operating system debugger exists within a partition, and further wherein said partition management firmware exists between said partition and said hardware, and wherein said operating system debugger is operable to directly access said physical memory using said extensions in conjunction with said partition management firmware.

* * * * *